United States Patent [19]
Garafalo et al.

[11] Patent Number: 5,902,635
[45] Date of Patent: *May 11, 1999

[54] TREATING PROCESS FOR PRECIPITATED SILICA FILLERS

[75] Inventors: Theresa A. Garafalo, Hudson; Robert A. Smith, Clifton Park, both of N.Y.

[73] Assignee: General Electric Company, Pittsfield, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,898

[22] Filed: Jul. 3, 1996

Related U.S. Application Data

[62] Division of application No. 08/524,732, Sep. 7, 1995, Pat. No. 5,561,176, which is a continuation of application No. 08/281,942, Jul. 28, 1994, abandoned.

[51] Int. Cl.$^6$ ................................. B05D 7/00; B05D 1/36
[52] U.S. Cl. ........................ 427/212; 427/215; 427/220; 427/407.1
[58] Field of Search ................................. 427/212, 215, 427/220, 407.1

[56] References Cited

U.S. PATENT DOCUMENTS

| | | |
|---|---|---|
| 2,938,009 | 5/1960 | Lucas . |
| 3,635,743 | 1/1972 | Smith . |
| 3,963,627 | 6/1976 | Cottrell . |
| 4,344,800 | 8/1982 | Lutz ........................................ 106/481 |
| 4,417,042 | 11/1983 | Dziark . |
| 4,425,384 | 1/1984 | Brownscombe . |
| 4,985,477 | 1/1991 | Collins et al. .......................... 523/212 |
| 5,013,772 | 5/1991 | Fujiki et al. . |
| 5,364,921 | 11/1994 | Gray et al. . |

FOREIGN PATENT DOCUMENTS

| | | |
|---|---|---|
| 0 374 951 | 6/1990 | European Pat. Off. . |
| 1420345 | 1/1976 | United Kingdom . |

*Primary Examiner*—Shrive Beck
*Assistant Examiner*—Bret Chen
*Attorney, Agent, or Firm*—Kenneth S. Wheelock

[57] ABSTRACT

A process for treating fillers, preferably precipitated silica, to improve the physical property profile of heat curable and room temperature vulcanizable silicone rubbers and a composition for room temperature vulcanizable rubbers comprising the silica filler treated by the process of the invention.

15 Claims, No Drawings

TREATING PROCESS FOR PRECIPITATED SILICA FILLERS

This is a divisional of application Ser. No. 08/524,732 filed on Sep. 7, 1995 now U.S. Pat. No. 5,561,176, which is a continuation of Ser. No. 08/281,942 filed on Jul. 28, 1994, now abandoned.

FIELD OF THE INVENTION

The instant invention relates to a process for treating precipitated silica fillers to improve the physical property profile of heat curable and room temperature vulcanizable silicone rubbers. More particularly the instant invention relates to a process for treating precipitated silica fillers to improve the physical property profile of room temperature vulcanizable silicone rubbers and to room temperature vulcanizable rubbers comprising the silica filler treated by the process of the invention.

BACKGROUND OF THE INVENTION

In the past there have been several attempts to treat silica fillers to improve thereby the physical property profile of the elastomers and rubbers compounded therewith. It continues to be desirable to develop fillers that impart a high tear to the cure rubber while having a low viscosity in the uncured state and a high application rate or flow. While various cross-linkers in the room temperature vulcanizable silicone rubber formulation will produce a cured rubber having a lower cross-link density, modulation of the cross-link density does not appear to be the main factor contributing to high tear values. Rather, it appears that the main requirement to achieve a room temperature vulcanizable silicone rubber having both a high tear and a low viscosity is to choose the appropriate reinforcing filler. The most appropriate reinforcing fillers for room temperature vulcanizable silicone rubbers satisfying these requirements are the various forms of high surface area silica, particularly precipitated and fumed silica.

Fumed or precipitated silica as obtained from the manufacturers generally contain anywhere from 0.10 to 5.00 weight percent water or the equivalent of water in terms of surface hydroxyl groups. Using such hydrated silica fillers as fillers in heat curable or room temperature due to structuring of the filler within the rubber or elastomer matrix. Dehydrating the silica by means of a suitable calcination produced a powder that had a tendency to clump together, i.e. it was no longer a free flowing powder. Accordingly, such a calcined silica filler was very difficult to process. Additionally, special precautions were usually necessary to handle such a calcined silica filler because of the extremely hygroscopic nature of the calcined silica.

An improvement disclosed by Lucas in U. S. Pat. No. 2,938,009 consisted of treating the silica filer with a cyclic siloxane. During the treating process the cyclic siloxanes would chemically react with the surface hydroxyl groups of the silica. This served to prevent intercondensation between the hydroxyl groups of the silica filler thereby inhibiting structuring of the filler within the rubber or elastomer matrix. However, it was later determined that only a portion of the surface hydroxyl groups were inactivated by this method of treatment.

Subsequent treatments have evolved into the treatment of the silica filler with alkoxy-hydroxy silicones in combination with amines. Improvements over this art separated the simultaneous treatment of the silica filler with a first step involving treating the silica filler with ammonia or an amine followed by a second step treating the silica filler with a silicone derivative.

Further improvements in the various processes for treating silica fillers involve more complicated treating processes. One such improvement is represented by U. S. Pat. No. 3,635,743 where a reinforcing silica filler is first treated with ammonia and subsequently treated with hexamethyldisilazane. The treatment with hexamethyldisilazane is particularly effective in providing silica filled rubber compositions having a high Durometer and a high viscosity prior to vulcanization. The unvulcanized rubbers filled with a silica filler that is first treated with ammonia and then with hexamethyldisilazane are typically characterized by non-Newtonian flow properties.

The use of filled thermoplastic polymers for structural purposes such as styrene butadiene rubbers and the like has been advanced by the treatment of the mineral filler material with a very thin layer of certain organic compounds. As taught in U. S. Pat. No. 4,425,384 to Brownscombe the organic compounds comprising the surface treating agent are reactive at one end such that they bond in a covalent fashion with the surface of the filler and the other end of the surface treating molecule is such that by the nature of its similarity to the polymer being reinforced the polymer like end of the surface treating moiety interacts with the polymer being reinforced "as if the segment were part of the polymer." As taught in Brownscombe's '384 patent, the surface treating moiety or organic compound must have an "oxygen-reactive" end to chemically bond with the surface of the filler. While Brownscombe's '384 patent teaches the chemical bonding of the surface treating moiety to the surface of a mineral filler material, the other portions of the molecular structure of Brownscombe 's surface treating agent are polymer-like such that they interact with the polymer being reinforced by the surface treated filler.

In the case of silica fillers, there is no known test that will predict the tear and viscosity of rubbers compounded therewith. Since silicas initially possess a certain degree of hydration that varies from 4.8 SiOH to 12.0 SiOH groups per square nanometer, it is generally desirable to modify the effect of the surface silyl hydroxyl groups, (SiOH), by an appropriate chemical treatment. The surface hydroxyl groups render the silica hydrophilic. Hydrophilic silicas are good desiccants, hydrating easily. Chemically appropriate surface treatments may succeed in converting the hydrophilic silica surface to a hydrophobic surface. When the silica surface has been rendered hydrophobic, such a hydrophobicized silica generally imparts some type of improvement to the physical property profile of room temperature vulcanized (RTV) rubbers that incorporate such fillers (see for example, "Silicone Elastomer Developments," 1967–1977, Warick et al., *Rubber Chemistry and Technology, Rubber Reviews*, July–August 1979, vol. 52(3), ISSN 0035-9475).

Several means to measure the hydrophilic or hydrophobic nature of the surface of the silica filler exist, among them a water miscibility test, a solubility test utilizing a water methanol solvent blend, as well as various ignition loss tests to measure the amount organic matter coating the surface of the silica. While these tests estimate the degree of surface treatment they are not predictive of the physical property profile of the resultant rubber when the rubber is compounded with any given treated or untreated filler.

There are thus several different art methods currently known that teach the treating of siliceous fillers for various plastic, thermoplastic, elastomeric, and rubber applications.

However, these art methods tend to be highly specific for the polymer formulation in question and vary, with an imperfect predictability, with the chemical nature of the filler comprising the filled polymer. Thus, methods of treating fumed silica fillers will tend to be different from those utilized to treat precipitated silica fillers because of the presence of a higher level of surface bound water in the case of the precipitated silicas as opposed to the almost anhydrous fumed silicas. The methods employed to chemically treat other fillers such as natural or synthetic calcium carbonate, finely divided. minerals, finely divided bulk or porous metal oxides and the like will also tend to be specific to the surface chemistry of the material chosen.

SUMMARY OF THE INVENTION

The instant invention comprises a process for treating silica fillers with an organosilane comprising a long chain hydrocarbon moiety followed by treating with a silazane derivative. Thus the present invention provides for a process for treating a reinforcing filler comprising: (a) selecting a filler having a water content varying from about 0.1 to about 5.0 weight percent based on the weight of said filler; (b) contacting said filler with a long chain hydrocarbon silicone compound at a temperature varying from 15° C. to 170° C. for a period of time sufficient to increase the weight of said filler by an amount varying from 0.001 to about 10.0 weight percent based on the weight of said filler or alternatively for a time sufficient to partially hydrophobicize said filler; and (c) further contacting the filler treated in step (b) with a disilazane compound at a temperature varying from 15° C. to 170° C. for a period of time sufficient to further increase the weight of said filler by an additional amount varying from 0.001 to about 10.0 weight percent based on the weight of said filler and the added weight of the treating agent of step (b), or alternatively for a time sufficient to completely hydrophobicize said filler.

More particularly, the instant invention is related to treating precipitated silica fillers. Thus there is additionally provided a process for treating a reinforcing silica filler comprising: (a) selecting a silica filler having a water content varying from about 0.1 to about 5.0 weight percent based on the weight of said filler; (b) contacting said filler with a long chain hydrocarbon silicone compound having the formula:

$$R^1Si(QR^2_i)_3$$

where Q is oxygen or nitrogen and i is 1 for oxygen and 2 for nitrogen, where $R^1$ is an 8 to 30 carbon monovalent hydrocarbon radical and $R^2$ is a 1 to 10 carbon monovalent hydrocarbon radical optionally containing one or more hydroxyl substitutions, said contacting occurring at a temperature varying from 15° C. to 170° C. for a period of time sufficient to increase the weight of said filler by an amount varying from 0.001 to about 10.0 weight percent based on the weight of said filler or alternatively for a time sufficient to partially hydrophobicize said filler; and (c) further contacting the filler treated in step (b) with a disilazane compound having the formula:

$$(CH_3)_3SiNHSi(CH_3)_3$$

at a temperature varying from 15° C. to 170° C. for a period of time sufficient to further increase the weight of said filler by an additional amount varying from 0.001 to about 10.0 weight percent based on the weight of said filler and the added weight of the treating agent of step (b) or alternatively for a time sufficient to completely hydrophobicize said filler.

The instant invention additionally comprises room temperature vulcanizable rubber compositions comprising the silica treated by the process of the invention.

DETAILED DESCRIPTION OF THE INVENTION

The present invention relates to a method of treating the surface of a reinforcing filler, said method comprising the steps of:
(a) treating a filler with a monomeric long chain hydrocarbon organosilane,
(b) treating the product from step (a) with a silazane compound. Further, the present invention specifically relates to applying the process of the invention to precipitated silica. And still further, the present invention relates to compounding RTV rubbers, e.g. RTV rubbers comprising polydimethylsiloxane polymers, with the precipitated silica treated by the process of the invention.

The process of the present invention comprises:
(a) contacting a finely divided reinforcing filler material having a BET surface area of at least 50 m²/gm containing at least about 0.1 weight percent absorbed water or water of hydration based on the weight of the reinforcing filler at temperature varying from about 15° C. to about 170° C. with
(b) a monomeric long chain hydrocarbon silicon derivative, followed by (c) contacting the reinforcing filler so treated with a silazane. The treated reinforcing fillers of the present invention find utility in curable silanol-containing silicone compositions that cure to form elastomers such as room temperature vulcanizable rubbers. The elastomers produced with the fillers of the present invention exhibit improvements in Die B tear when cured and have a low viscosity prior to curing.

The long chain hydrocarbon silicone compounds used in the process of the present invention have the formula:

$$R^1Si(QR^2_i)_3$$

where Q is oxygen or nitrogen and i is 1 for oxygen and 2 for nitrogen, where $R^1$ is an 8 to 30 carbon monovalent hydrocarbon radical and $R^2$ is a 1 to 10 carbon monovalent hydrocarbon radical optionally containing one or more hydroxyl substitutions.

The silazane compound used in the process of this invention has the formula:

$$((R^3)_3Si)_2NH$$

where $R^3$ is a monovalent alkyl or aryl hydrocarbon radical.

Provided sufficient water is present, either as water absorbed on the surface of the filler or added externally such as from about 0.1 to about 5.0 percent by weight water, based on the weight of the filler, such filler may be used directly in the practice of the present invention. For example, in a preferred embodiment the silica is a precipitated silica. The precipitated silica may be prepared by any of several techniques known in the art. What is generally required is that the preferred precipitated silica is a high surface area silica prepared by precipitation from an aqueous solution containing the silica precursor. The precipitated silica is filtered and dried by conventional techniques to where the range of surface bound water, present either as an adsorbed phase, hydroxyl groups, hydrated hydroxyl groups, or any mixture of the forgoing is within the desired range previously set forth.

The silica is then treated, with one or more of the long chain hydrocarbon silicone derivatives. If the treating agent is a solid, the preferred mode of treatment is to utilize a solution of the treating agent and contact the solution with the precipitated silica. If the treating agent is a liquid, it may be used neat or in solution in a fashion similar to that which would be employed for solid treating agents. When solution treating is employed, excess solvent and or treating agent may be removed by washing, drying, vacuum drying, calcination, pyrolysis or any combination of these and other similar techniques. The treating time does not appear to be particularly critical and may vary from a period of time as short as a few minutes to as long as several days depending on the reactivity of the treating agent and the extent of treatment desired. The treated silica is subsequently treated with a silazane compound in a similar fashion and excess silazane, if any is removed by the same techniques. Depending on the level of treatment, the weight of the silica is increased by anywhere from about 0.001 weight percent to 10.0 weight percent. The treatment renders the filler more or less hydrophobic as measured by a simple water wetting test, i.e. the treated silica will not wet and actually floats on the surface of the water. Applicants thus define a completely hydrophobicized filler as a filler that floats on water when contacted with water as a consequence of the treatments herein disclosed. A partially hydrophobicized filler is thus defined as an intermediate stage in the continuum ranging from hydrophilic to hydrophobic, wherein the partially hydrophobicized filler has a reduced capacity to be wetted by water, as compared to the same untreated hydrophilic filler by a variety of simple experimental tests appropriate for such high surface area materials such as water floatation, incipient wetness, and the like. This is in contrast to fillers that are wetted by water, i.e. hydrophilic fillers. The fillers preferred for use in the present invention are silica fillers, more preferably precipitated silica fillers. The process of the present invention may also be applied to other materials suitable for use as fillers such as alumna, titania, boria, silica-alumina, zeolites, micas, activated carbon, porous carbon fibers, porous glass fibers, carbon fibers, glass fibers, and various ceramic fibers such as SiC and SiN.

The treated filler may then be incorporated into various elastomeric precursor compositions to effect desired changes in the physical property profile of the cured elastomer or RTV.

Experimental
Treatment A. Treatment of Filler with Long Chain Hydrocarbon Silicon Derivative 249 g of precipitated silica filler available commercially as FK-160 silica from Degussa was added to a 1 gallon Waring blender containing 199 g of water. 1 gm of a C18 long chain hydrocarbon silicon derivative compound available commercially as PS-200 from Huls America was then added. The mixture was mixed for 1 minute at high speed. An additional 5 g of PS-200 in 195 g water was subsequently added and the mixture again mixed at high speed for 1 minute. The treated filler was removed from the blender as a moist white powder and dried for 1 hour in a fume hood and subsequently dried at 300° F. overnight (16 to 18 hours) in an air circulating oven. The material as dried overnight was subsequently treated with hexamethyldisilazane according to the procedure of Treatment B.

Treatment B. Silazane Treatment of Filler

Place between 150 and 260 g of filler to be treated into a vacuum desiccator along with 10 to 20 g of hexamethyldisilazane. Apply a vacuum of 10 mm Hg or less to the vacuum desiccator and allow to stand for 6 to 7 hours under vacuum. Release the vacuum, and air dry the filler at 300° F. for a period varying from 16 to 21 hours. While the filler is still hot from the oven drying, replace the filler in a vacuum desiccator along with an additional quantity of 10 to 20 g hexamethyldisilazane, apply a vacuum of no more than 10 mm Hg and allow to stand for 6 to 7 hours. Release the vacuum, and air dry the filler at 300° F. for a period varying from 16 to 21 hours.

Treated silica fillers were prepared using the combination of treatment A and B in sequence or with treatment B alone. The fillers were then compounded in a room temperature vulcanizable silicone rubber formulation based on a polydimethylsiloxane silicone polymer and evaluated both in a cured and uncured state.

The comparative formulations demonstrating one embodiment of the instant invention were utilized in a standardized RTV formulation as follows:

| | | |
|---|---|---|
| Polydimethylsiloxane silanol stopped polymer viscosity 30,000 cps at 25° C. | 56.85 | wt. % |
| Filler to be evaluated: | 25.00 | wt. % |
| Polydimethylsiloxane M stopped polymer viscosity 50 cps at 25° C. | 17.00 | wt. % |
| Polydimethylsiloxane silanol stopped polymer viscosity 20 to 30 cps at 25° C. | 1.15 | wt. % |

TABLE 1

Comparative RTV Formulations Utilizing Different Treatments for the Precipitated Silica Filler

| Preparation: | I | II | III | IV |
|---|---|---|---|---|
| Silica Treatment | | | | |
| B only | yes | yes | no | no |
| Acid (note 1) | no | no | yes | no |
| A and B | no | no | no | yes |
| Uncured Properties: | | | | |
| Brookfield Viscosity Model RVF, cps | 159,000 | 180,000 | 295,000 | 160,000 |
| 10% Beta 1 Catalyst Work Life, min. (note 2) | 85 | 150 | 90 | 140 |
| Tack Free time, min. | 150 | 195 | 210 | 270 |
| Cured Properties 24 Hr. Shore A 1/4" deep cup, | | | | |
| Top | 37 | 35 | 33 | 27 |
| Bottom | 29 | 31 | 31 | 27 |
| Three Day Cure, Shore A, at room temperature | 39 | 36 | 37 | 33 |
| Average Tensile Strength (ASTM-D-412), psi | 694 | 717 | 579 | 818 |
| Average Elongation at Break (ASTM D-412), % | 539 | 376 | 328 | 422 |
| Die B Tear (ASTM D-624) pli (avg. of 3) | 112 | 226 | 185 | 170 |

Notes:
1. Acid treatment consists of preparing an acid treating solution of about 20 weight percent of a 1.5 weight percent concentrated HCl in water solution with 80 weight percent iso-propyl alcohol. Adding about 1.8 weight percent of the acid treating solution to about 98.2 weight percent of the FK-160 and mixing for from about 1 to 10 minutes in a Waring blender at high speed, removing the moist acid treated silica powder from the Waring blender, drying in ambient air for about 1 hour,followed by drying in a hot air circulating oven overnight, i.e. for about 16 to 18 hours at 300° F. The filler acidified and dried by this method is then subjected to treatment B. The purpose of using acidified water is to acidify the surface of the precipitated silica filler as a preparative step prior to vacuum treatment with a silazane compound. Acid activation of the silica increases the efficiency of the reaction of the surface silanol or hydroxy groups with the silazane.

TABLE 1-continued

Comparative RTV Formulations Utilizing Different Treatments for the Precipitated Silica Filler

| Preparation: | I | II | III | IV |
|---|---|---|---|---|

2. Beta catalyst work life is defined as the time from catalyzation to the time at which the rubber can no longer be pulled up by a spatula from the catalyzed mass by no more than 1/4". This test is also known as the "Snap" test since at this point in the cure of the rubber, the rubber breaks or snaps from the end of the spatula.

TABLE 2

Comparative RTV Formulations Utilizing Hexamethyldisilazane Treated Precipitated Silica Filler in the Standard Formulation Diluted with Varying Amounts of a 50 cps Oranopolysiloxane Oil Compared to Formula IV Diluted with 20 Wt. % of a 50 cps Oranopolysiloxane Oil.

| Preparation: | V | VI | VII | IV |
|---|---|---|---|---|
| Silica Treatment | | | | |
| B only | yes | yes | yes | no |
| A and B | no | no | no | yes |
| Uncured Properties: | | | | |
| Brookfield Viscosity Model RVF, cps | 110,000 | 87,500 | 58,800 | 38,000 |
| Cured Properties | | | | |
| Three Day Cure, Shore A, at room temperature | 26 | 23 | 20 | 29 |
| Average Tensile Strength (ASTM-D-412), psi | 407 | 323 | 277 | 725 |
| Average Elongation at Break (ASTM D-412), % | 257 | 232 | 229 | 381 |
| Die B Tear (ASTM D-624) pli (avg. of 3) | 111 | 71 | 42 | 158 |

Notes:
There are no acid treated dilution examples based on III due to the very high viscosity, 295,000 cps, of III.

Discussion of results:

In the test formulation used, preparations I, II, and III produce reasonable Die B tear strengths. Both preparation II and III (the acid treated filler) yield higher compound viscosities than preparation IV. Comparing the similar viscosities of preparations I and IV, 159,000 and 160,000 cps respectively, it was found that preparation IV had a far better Die B tear strength than preparation I, 170 vs. 112 pli respectively. Since it is desirable to have both a high Die B tear strength and a low viscosity, preferably below about 100,000 cps, both of these formulations must be diluted with a plasticizing oil.

It is seen in preparations V, VI and VII, compared to preparation IV, that the silazane treated filler, as used in preparations I and II, when incorporated in the test formulation with various levels of the 50 cps oil, do produce lower viscosity compounds. In preparation V, using 88.9 weight percent test formula diluted with 11.1 weight percent 50 cps oil, the viscosity is reduced to 110,000 cps while the Die B tear strength remains about the same. In preparation VI, with a formulation to oil weight ratio of 86:14 respectively, the viscosity is further reduced to 87,500 cps and the Die B tear strength decreases to about 71 pli. Finally at a formulation to oil weight ratio of 80:20, the viscosity has been reduced to 58,800 cps and the Die B tear strength has been significantly reduced to 42 pli. These results should be compared to preparation IV where the same 80:20 dilution produces an even lower viscosity of 38,000 cps, however the Die B tear strength remains high at 158 pli. This indicates that the surface treating agent has modified the silica filler such that even when the rubber is diluted with plasticizing oil to produce the desired lower viscosity, good Die B tear strengths are maintained.

Having described the invention, that which is claimed is:

1. A process for treating a reinforcing filler comprising:
   (a) selecting a filler having a water content varying from about 0.1 to about 5.0 weight percent based on the weight of said filler;
   (b) contacting said filler with a solid or liquid hydrocarbon organosilane compound containing at least 11 carbon atoms total at a temperature between 15° C. to 170° C. for a period of time sufficient to increase the weight of said filler by an amount varying from 0.001 to about 10.0 weight percent based on the weight of said filler;
   (c) further contacting said fill with disilazane compound at a temperature between 15° C. to 170° C. for a period of time sufficient to further increase the weight of said filler by an additional amount vary from 0.001 to about 10.0 weight percent based on the weight of said filler and the added weight of the hydrocarbon organosilane compound of step (b) to produce a completely hydrophobicized filler; and
   (d) further adding an effective amount of a plasticizing oil to said filler producing a mixture of said plasticizing oil and said filler wherein said mixture has viscosity of less than approximately 100,000 centipoise.

2. The process of claim 1 wherein the filler is a precipitated silica.

3. The process of claim 2 wherein $R^1$ of the hydrocarbon organosilane compound of step (b) is a C18 monovalent hydrocarbon radical.

4. The process of claim 3 wherein the disilazane compound of step (c) is hexamethyldisilazane.

5. The process of claim 2 wherein the disilazane compound of step (c) is hexamethyldisilazane.

6. The process of claim 1 wherein the hydrocarbon organosilane compound of step (b) has the formula:

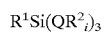

$$R^1Si(QR^2{}_i)_3$$

where Q is oxygen or nitrogen and i is 1 for oxygen and 2 for nitrogen, where $R^1$ is an 8 to 30 carbon monovalent hydrocarbon radical and $R^2$ is a 1 to 10 carbon monovalent hydrocarbon radical optionally containing one or more hydroxyl substitutions.

7. The process of claim 1 wherein the disilazane compound of step (c) is hexamethyldisilazane.

8. A process for treating a reinforcing filler comprising:
   (a) selecting a filler having a water content varying from about 0.1 to about 5.0 weight percent based on the weight of said filler;
   (b) contacting said filler with a solid or liquid hydrocarbon organosilane compound containing at least 11 carbon atoms total having the formula:

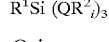

$$R^1Si\,(QR^2{}_i)_3$$

where Q is oxygen or nitrogen and i is 1 for oxygen and 2 for nitrogen, where $R^1$ is an 8 to 30 carbon monovalent hydrocarbon radical and $R^2$ is a 1 to 10 carbon monovalent hydrocarbon radical optionally containing one or more hydroxyl substitutions, said contacting occurring at a temperature between 15° C. to 170° C. for a period of time sufficient to increase the weight of said filler by an amount varying from 0.001 to about 10.0 weight percent based on the weight of said filler;

(c) further contacting said filler with a disilazane compound having the formula:

$((R^3)_3Si)_2NH$ where $R^3$ is a monovalent alkyl or aryl hydrocarbon radical, wherein said further contacting occurs at a temperature between 15° C. to 170° C. for a period of time sufficient to further increase the weight of said filler by an additional amount varying from 0.001 to about 10.0 weight percent based on the weight of said filler and the added weight of the hydrocarbon organosilane compound of step (b) to produce a completely hydrophobicized filler; and (d) further adding an effective amount of a plasticizing oil to said filler producing a mixture of said plasticizing oil and said filler wherein said mixture has a viscosity of less than approximately 100,000 centipoise.

9. The process of claim 8 wherein the filler is a precipitated silica.

10. The process of claim 9 wherein $R^1$ of the hydrocarbon organosilane compound of step (b) is a C18 monovalent hydrocarbon radical.

11. The process of claim 10 wherein the disilazane compound of step (c) is hexamethyldisilazane.

12. The process of claim 9 wherein the disilazane compound of step (c) is hexamethyldisilazane.

13. The process of claim 8 wherein $R^1$ of the hydrocarbon organosilane compound of step (b) is a C18 monovalent hydrocarbon radical.

14. The process of claim 8 wherein the disilazane compound of step (c) is hexamethyldisilazane.

15. A process for treating a reinforcing filler consisting essentially of:

(a) selecting a filler having a water content varying from about 0.1 to about 5.0 weight percent based on the weight of said filler;

(b) contacting said filler with a solid or liquid hydrocarbon organosilane compound containing at least 11 carbon atoms total having the formula:

$R^1Si(QR^2_i)_3$ where Q is oxygen or nitrogen and i is 1 for oxygen and 2 for nitrogen, where $R^1$ is an 8 to 30 carbon monovalent hydrocarbon radical and $R^2$ is a 1 to 10 carbon monovalent hydrocarbon radical optionally containing one or more hydroxyl substitutions, said contacting occurring at a temperature between 15° C. to 170° C. for a period of time sufficient to increase the weight of said filler by an amount varying from 0.001 to about 10.0 weight percent based on the weight of said filler;

(c) further contacting said filler with a disilazane compound having the formula:

$((R^3)_3Si)_2NH$ where $R^3$ is a monovalent alkyl or aryl hydrocarbon radical, wherein said further contacting occurs at a temperature between 15°C. to 170°C. for a period of time sufficient to further increase the weight of said filler by an additional amount varying from 0.001 to about 10.0 weight percent based on the weight of said filler and the added weight of the hydrocarbon organosilane compound of step (b) to produce a completely hydrophobicized filler; and (d) further adding an effective amount of a plasticizing oil to said filler producing a mixture of said plasticizing oil and said filler wherein said mixture has a viscosity of less than approximately 100,000 centipoise.

* * * * *